(12) United States Patent
Zhang

(10) Patent No.: US 10,318,226 B2
(45) Date of Patent: Jun. 11, 2019

(54) GLOBAL COMMAND INTERFACE FOR A HYBRID DISPLAY

(71) Applicant: Google LLC, Mountain View (CA)

(72) Inventor: Zhibin Zhang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 77 days.

(21) Appl. No.: 15/380,171

(22) Filed: Dec. 15, 2016

(65) Prior Publication Data

US 2017/0212717 A1 Jul. 27, 2017

Related U.S. Application Data

(60) Provisional application No. 62/281,317, filed on Jan. 21, 2016.

(51) Int. Cl.
*G06F 3/14* (2006.01)
*G09G 3/00* (2006.01)
(Continued)

(52) U.S. Cl.
CPC ......... *G06F 3/1423* (2013.01); *G02B 27/017* (2013.01); *G06F 3/1446* (2013.01); *G06T 19/006* (2013.01); *G09G 3/003* (2013.01); *G09G 5/006* (2013.01); *G09G 5/12* (2013.01); *G02B 2027/014* (2013.01);
(Continued)

(58) Field of Classification Search
CPC ... G06F 3/1423; G06F 3/1446; G02B 27/017; G02B 2027/0187; G02B 2027/014; G09G 5/006; G09G 5/12; G09G 2352/00; G09G 2340/0407; G09G 2320/0686;
(Continued)

(56) References Cited

U.S. PATENT DOCUMENTS 8,054,314 B2 11/2011 Kelley et al.
8,781,260 B2 7/2014 Hunkins et al.
(Continued)

FOREIGN PATENT DOCUMENTS

JP 2006337859 12/2006

OTHER PUBLICATIONS

Second Written Opinion of the International Preliminary Examining Authority dated Dec. 19, 2017 for PCT Application No. PCT/US2016/066996, 6 pages.
(Continued)

*Primary Examiner* — Laurence J Lee

(57) ABSTRACT

A hybrid display includes a first display having a first interface and a second display having a second interface. A third interface is configured to receive a first command that includes a first value indicating a modification of pixels in the hybrid display. A finite state machine is configured to translate the first value to a second value indicating a modification of pixels in the first display and a third value indicating a modification of pixels in the second display. The first interface transmits a second command including the second value to the first interface and a third command including the third value to the second interface. The first and second commands are transmitted at times determined by a relative delay between the first display and the second display.

20 Claims, 8 Drawing Sheets

(51) Int. Cl.
  *G09G 5/00* (2006.01)
  *G09G 5/12* (2006.01)
  *G02B 27/01* (2006.01)
  *G06T 19/00* (2011.01)

(52) U.S. Cl.
  CPC ............... *G02B 2027/0187* (2013.01); *G09G 2300/023* (2013.01); *G09G 2320/0247* (2013.01); *G09G 2320/0626* (2013.01); *G09G 2320/0666* (2013.01); *G09G 2320/0686* (2013.01); *G09G 2340/0407* (2013.01); *G09G 2352/00* (2013.01); *G09G 2370/18* (2013.01)

(58) Field of Classification Search
  CPC ..... G09G 2320/0626; G09G 2300/023; G09G 2320/0666; G06T 2207/20212
  See application file for complete search history.

(56) References Cited

U.S. PATENT DOCUMENTS

| | | |
|---|---|---|
| 2002/0167531 A1 | 11/2002 | Baudisch |
| 2004/0227703 A1 | 11/2004 | Lamvik et al. |
| 2011/0080417 A1 | 4/2011 | Lin et al. |
| 2014/0204036 A1* | 7/2014 | Schillings ............. G06F 3/0418 345/173 |
| 2015/0029217 A1 | 1/2015 | Ur et al. |

OTHER PUBLICATIONS

Hughes, N., Apple Insider, <http://appleinsider.com/articles/11/04/07/apple_exploring_hybrid_e_ink_lcd_displays_with_independent_regions>, Accessed Feb. 24, 2017, 4 pages.

International Search Report and Written Opinion correlating to PCT/US2016/066996, dated Mar. 27, 2017, 10 pages.

International Preliminary Report on Patentability dated Jun. 5, 2018 for PCT Application No. PCT/US2016/066996, 24 pages.

* cited by examiner

GLOBAL COMMAND INTERFACE FOR A HYBRID DISPLAY

FIELD OF THE DISCLOSURE

The present disclosure relates generally to display systems and more particularly to interfaces to display systems.

BACKGROUND

Immersive virtual reality (VR) and augmented reality (AR) systems typically utilize a head mounted display (HMD) device that presents stereoscopic imagery to the user so as to give a sense of presence in a three-dimensional (3D) scene. For example, a typical HMD device is designed to produce a stereoscopic image over a field-of-view that approaches or is equal to the field-of-view of a human eye, which is approximately 180°. Conventional HMD devices implement either a single flat display that is separated into two independent display regions, one for the left eye and one for the right eye of the user, or a pair of independent flat displays, one for each eye of the user. The conventional HMD device further includes a circular lens for each eye so as to focus the entire image of the display into the user's eye.

The human eye is able to differentiate between adjacent features of an image to an eye-limiting resolution of approximately 1 arcmin/pixel, which corresponds to a pixel density of approximately 60 pixels/degree. However, the human eye is only able to perceive features at eye-limiting resolution within an area of focus of approximately 60° from a center of focus. Features outside of the area of focus (e.g., at angles between 60° and 180°) are perceived with peripheral vision at a much lower resolution. The cost and complexity of an HMD is significantly and unnecessarily increased if the display is implemented with a sufficient pixel density to provide eye-limiting resolution of over the entire 180° field-of-view. Conventional HMD devices are therefore designed to balance the competing demands for high resolution and low cost/complexity by using displays that have a pixel density of 10-20 pixels/degree.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
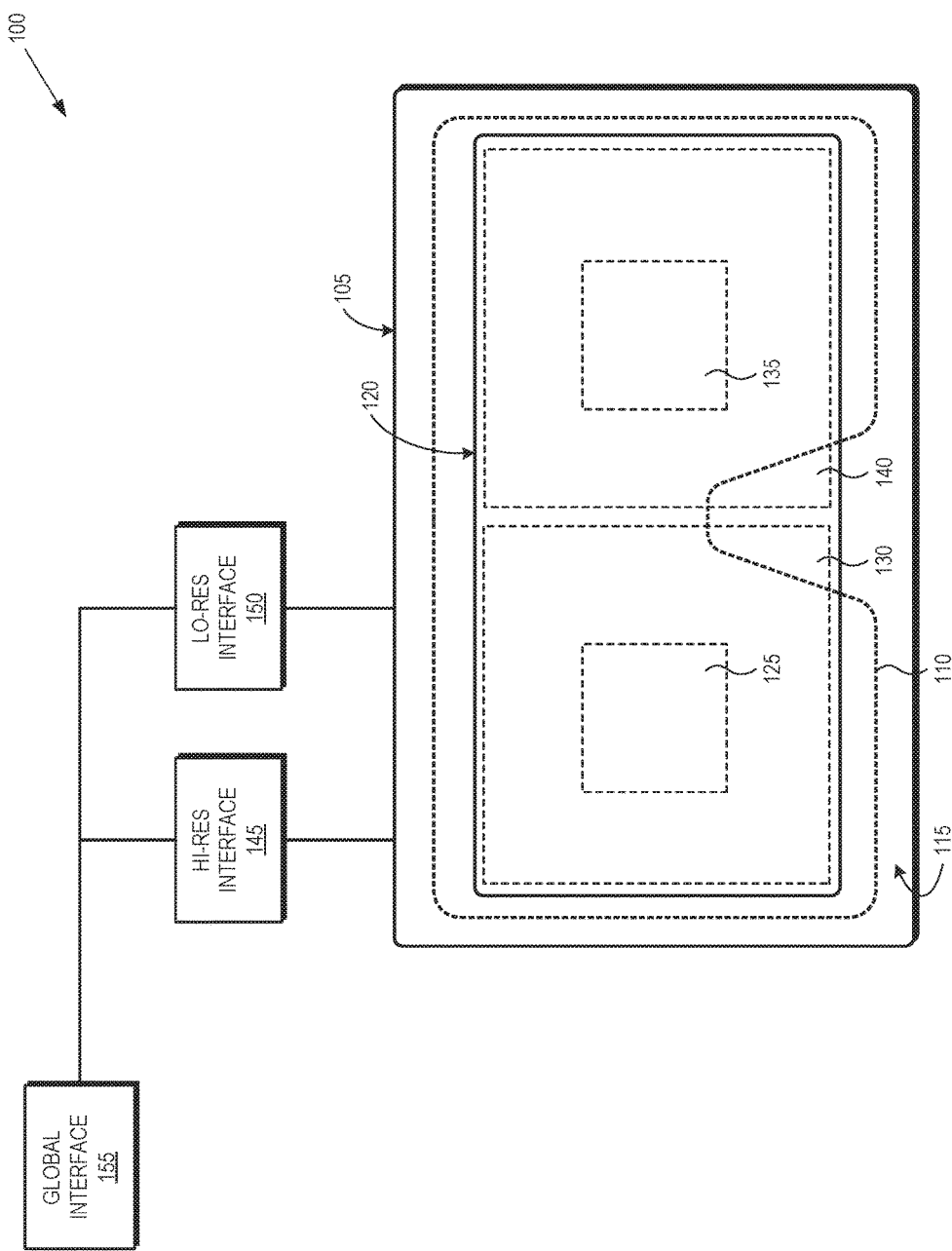
FIG. 1 illustrates a display system that includes an electronic device configured to provide AR or VR functionality via a hybrid display in accordance with at least one embodiment of the present disclosure.

The following description is intended to convey a thorough understanding of the present disclosure by providing a number of specific embodiments and details involving imagery capture and display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-8 illustrate embodiments of a hybrid display that combines a low-resolution display (e.g., a display constructed of pixels that have a pixel size of approximately 60 µm) with a high-resolution display (e.g. a semiconductor micro display constructed of pixels that have a pixel size of approximately 2 µm or less). For example, an HMD may include two high-resolution displays for displaying a portion of an image in the areas of focus of the left and right eyes of the user of the HMD. The hybrid display also includes two low-resolution displays for displaying a portion of the image that falls outside the areas of focus of the left and right eyes of the user. The high and low-resolution displays may be overlaid with each other or the low-resolution display may be formed in a region that wraps around or encompasses the outer boundary of the high-resolution display. Additional optical elements may be used to combine and focus light emitted by the pixels in the high-resolution and low-resolution displays on to the user's eyes.

Conventional high-resolution displays and low-resolution displays are controlled using different interfaces. For example, the interface to a conventional high-resolution display may be implemented as an inter-integrated circuit ($I^2C$) and the interface to a conventional low-resolution display may be implemented as a Mobile Industry Processor Interface (MIPI), an embedded display port (eDP) interface, or a mobile display digital interface (MDDI). The control path speed for an $I^2C$ interface is on the order of hundreds of kilohertz (kHz) and the control path speed for a MIPI (or other low-resolution display) interface is on the order of tens of megahertz (MHz). Furthermore, the packet overhead in data packets transmitted by an $I^2C$ interface is larger than the packet overhead in data packets transmitted by a MIPI interface. The different control path speeds and packet overheads introduce timing differences between the two interfaces that can generate noticeable visual artifacts such as flicker in response to global commands that affect pixels in both the high-resolution display and the low-resolution display. For example, a dimming algorithm can modify the brightness of the image produced by the display by transmitting (via the respective interfaces) global dimming commands to the high-resolution and low-resolution displays. The different control path speeds and packet overheads result in different values of the lag between transmission of the global command to the displays via the corresponding interfaces and the resulting change in the pixel values. The relative timing delays produced by the different values of the lag may generate flicker in the combined image produced by the high-resolution display and the low-resolution display. The flicker may be exacerbated by different color matrices that map the brightness indicated by the global command to different values of the brightness produced by the high resolution and low-resolution displays.

The visual artifacts produced by a hybrid display in response to receiving a global command may be reduced by translating the global command to interface-specific commands that are understood by corresponding interfaces to the high-resolution display and the low-resolution display. The interface-specific commands include values that represent one or more characteristics of the images. The different values in the interface-specific commands are generated from a corresponding value in the global command based on different physical properties of the high-resolution display and the low-resolution display. For example, a global command may be issued to reduce the brightness of an image produced by the hybrid display by a predetermined amount that is represented by a change in a value of the luma for each pixel. The luma values are stored in one or more registers associated with the high-resolution display and the low-resolution display. The stored values are used to control a bias current or voltage that is applied to pixels in response to input signals provided by the interfaces to the high-resolution display and the low-resolution display. The bias currents or voltages applied to the pixels in the different displays, as well as the colors produced by the pixels in response to the applied bias current or voltage, are typically different due to different physical properties of the high-resolution display and the low-resolution display. The values of the luma indicated in the global command may therefore be translated to interface-specific values based on the physical properties of the displays. For example, a finite state machine may receive the global command and selectively modify the luma value (or change in the luma value) indicated in the global command based on different color matrices that represent the relationship between a value of luma and corresponding RGB values that define the colors displayed by the high-resolution display and the low-resolution display. The finite state machine modifies the luma values so that the change in brightness perceived by the user is substantially the same for the high-resolution display and the low-resolution display. The finite state machine may also translate other global command values such as values that indicate a chroma that controls the bias currents or voltages applied to pixels in response to input signals representative of chroma, color matrices that are used to transform luma and chroma to RGB values used by the displays, gamma values that determine a power law relationship between an input value of luma and a gamma-corrected value of luma used for encoding, color coordinates, a color gamut, and the like.

The global command interface may then provide the interface-specific commands (including the translated global command values) to the high-resolution display interface and the low-resolution display interface. To avoid flickering, the finite state machine time synchronizes the interface-specific commands so that they are provided to the different interfaces at substantially the same time. For example, the finite state machine may provide the interface-specific commands to first-in-first out (FIFO) buffers at times that are offset by values of relative delays between signals indicating a refresh interval and a blanking interval for the high-resolution display and the low-resolution display. The values in the FIFO buffers are then shifted into the appropriate registers during the synchronized blanking intervals. Some embodiments of the offset may be determined based on the amount of overhead or data in the packets transmitted over the different interfaces. The finite state machine may also configure timing parameters of the high-resolution display interface and the low-resolution display interface using interface-specific commands. Examples of timing parameters include parameters that specify timing of a horizontal synchronization signal that separates scan lines in the displays, a vertical synchronization signal that separates fields in the displays, pixel scan directions, a blanking interval during which no data is transmitted, and the like.

FIG. 1 illustrates a display system 100 that includes an electronic device 105 configured to provide AR or VR functionality via a hybrid display in accordance with at least one embodiment of the present disclosure. The illustrated embodiment of the electronic device 105 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 105 can include a fixture device, such as medical imaging equipment, a security imaging sensor system, an industrial robot control system, a drone control system, and the like. For ease of illustration, the electronic device 105 is generally described herein in the example context of an HMD system; however, the electronic device 105 is not limited to these example implementations.

A back plan view of an example implementation of the electronic device 105 in an HMD form factor in accordance with at least one embodiment of the present disclosure is shown in FIG. 1. The electronic device 105 may be implemented in other form factors, such as a smart phone form factor, tablet form factor, a medical imaging device form factor, and the like, which implement configurations analogous to those illustrated. As illustrated by the back plan view, the electronic device 105 can include a face gasket 110 mounted on a surface 115 for securing the electronic device 105 to the face of the user (along with the use of straps or a harness).

The electronic device 105 includes a hybrid display 120 that is used to generate images such as VR images or AR images that are provided to the user. The hybrid display 120 is divided into two substantially identical portions, a right portion to provide images to the right eye of the user and a left portion to provide images to the left eye of the user. The left portion includes a relatively high resolution display 125 that is positioned at the center of the field-of-view of the user and a relatively low-resolution display 130 that encompasses the high-resolution display 125 and provides images at larger angles with respect to the center of the field-of-view that correspond to the regions of peripheral vision of the user. The right portion includes a high-resolution display 135 and a low-resolution display 140 that are substantially identical to the corresponding high resolution display 125 and low-resolution display 130. The high-resolution displays 125, 135 have a larger pixel density than the low-resolution displays 130, 140. Pixel sizes in the high-resolution displays 125, 135 are smaller than pixel sizes in the low-resolution displays 130, 140. For example, the high-resolution displays 125, 135 may have a pixel size of less than 5 μm (such as a pixel size of 2 μm) and the low-resolution displays 130, 140 may have a pixel size in the range of 10-100 μm, such as a pixel size of 60 μm.

The high-resolution displays 125, 135 are controlled using signals provided by one or more high-resolution interfaces 145. Some embodiments of the high-resolution interfaces 145 are implemented as an inter-integrated circuit ($I^2C$) interface that has a control path speed on the order of hundreds of kilohertz (kHz). The low-resolution displays 130, 140 are controlled using signals provided by one or more low-resolution interfaces 150. The low-resolution interfaces 150 may be implemented as a Mobile Industry Processor Interface (MIPI), an embedded display port (eDP) interface, or a mobile display digital interface (MDDI). The control path speed for a MIPI (or other low-resolution) interface is on the order of tens of megahertz (MHz). In some embodiments, the packet overhead in data packets transmitted by an $I^2C$ interface such as the high-resolution displays 125, 135 is larger than the packet overhead in data packets transmitted by a MIPI, eDP, or MDDI interface such as the low-resolution displays 130, 140.

The display system 100 includes a global interface 155 for receiving global commands to control or modify images displayed by the high-resolution displays 125, 135 and the low-resolution displays 130, 140 in the hybrid display 120. As used herein, the term "global command" refers to a command that is used to control or modify characteristics of the light generated by one or more pixels in the high-resolution displays 125, 135 and one or more pixels in the low-resolution displays 130, 140. For example, the global interface 155 may receive a global command to dim the light generated by the high-resolution displays 125, 135 and the low-resolution displays 130, 140 by changing the brightness of the pixels in the hybrid display 120. Global commands indicate values (or modifications to values) of characteristics of the light generated by the pixels that are intended to cause predetermined modifications in observed images produced by the pixels in the hybrid display 120. However, the different physical characteristics of the high-resolution displays 125, 135 and the low-resolution displays 130, 140 may cause the pixels in these displays to produce light having different characteristics in response to the same global command. Moreover, timing differences between the high-resolution interface 145 and the low-resolution interface 150 may cause the modifications to occur at different times in the high-resolution displays 125, 135 and the low-resolution displays 130, 140.

In order to reduce the flicker caused by timing differences or different physical characteristics, some embodiments of the global interface 155 perform translation and synchronization operations on the global command to produce interface-specific commands that are transmitted to the high-resolution interface 145 and the low-resolution interface 150. For example, the global interface 155 may receive a global command that includes one or more values indicating a modification of signals provided to pixels in the hybrid display 120. The global interface 155 may then translate the one or more values into corresponding values indicating modifications of the signals provided to the pixels in the high-resolution displays 125, 135 and the low-resolution displays 130, 140 based on the different physical properties or characteristics of the displays 125, 130, 135, 140. The global interface 155 can access information indicating timing delays (or a relative timing delay) between control signals used by the high-resolution displays 125, 135 and the low-resolution displays 130, 140. The global interface 155 uses the timing delays (or relative timing delay) to synchronize the interface-specific commands, e.g., by transmitting commands to the high-resolution interface 145 and the low-resolution interface 150 at times determined by the timing delays (or relative timing delay) so that interface-specific commands including the translated values are provided at substantially the same time. Some embodiments of the global interface 155 modify timing of a vertical synchronization signal (VSYNC) of one or more of the interfaces 145, 150 to align the vertical synchronization signals of the interfaces 145, 150, as discussed herein.

Figure 2:
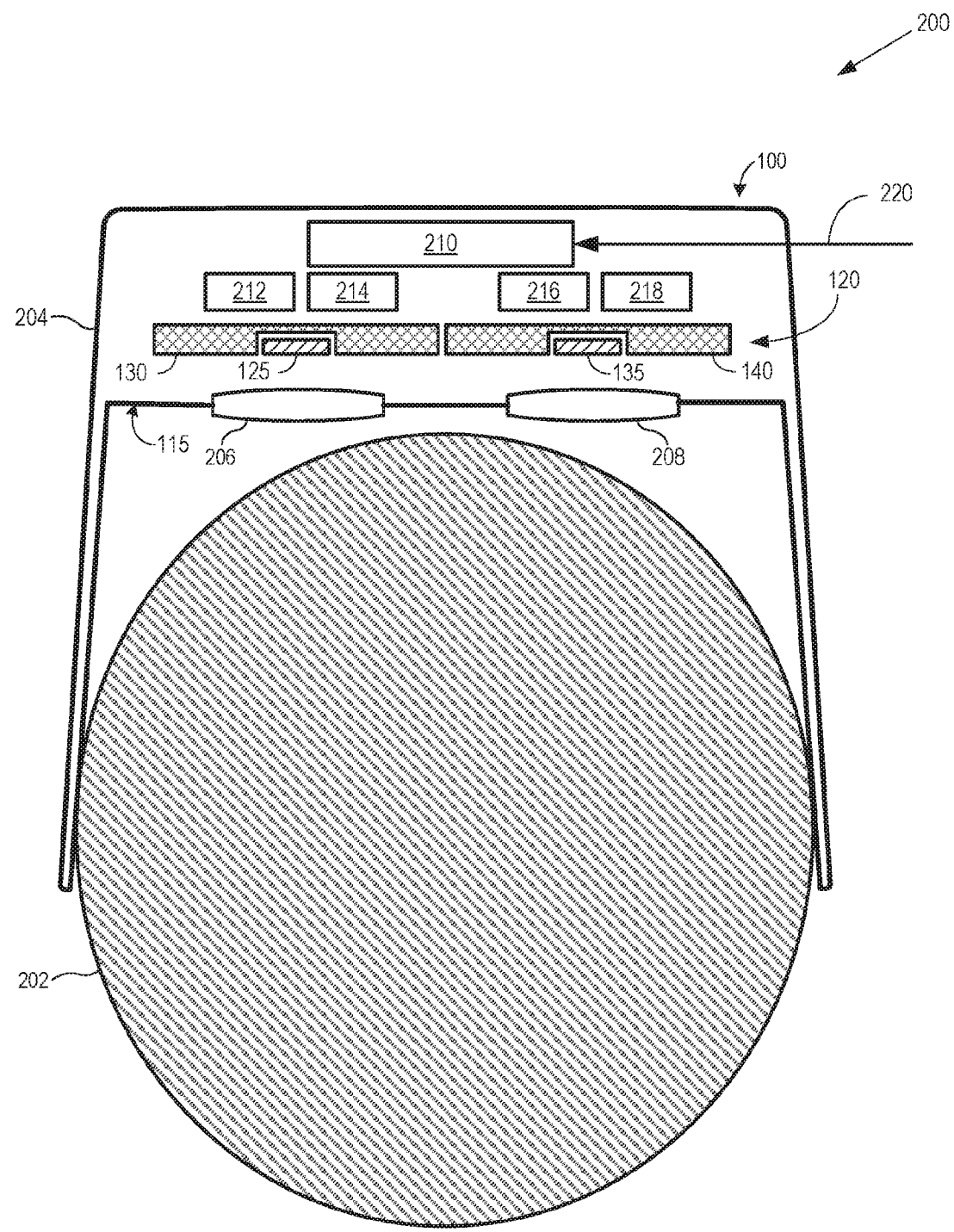
FIG. 2 illustrates an example cross-section view of the electronic device as mounted on the head of a user in accordance with at least one embodiment of the present disclosure.

FIG. 2 illustrates an example cross-section view 200 of the electronic device 105 as mounted on the head 202 of a user in accordance with at least one embodiment of the present disclosure. As illustrated, the electronic device 105 includes a housing 204 that includes the high-resolution displays 125, 135 and the low-resolution displays 130, 140 that form the hybrid display 120. The electronic device 105 also includes eyepiece lenses 206 and 208 disposed in corresponding apertures or other openings in the user-facing surface 115 of the housing 204. The electronic device 105 further includes the hybrid display 120 disposed distal to the eyepiece lenses 206 and 208 within the housing 204. The eyepiece lens 206 is aligned with the high-resolution display 125 and the low-resolution display 130 shown in FIG. 1, while the eyepiece lens 208 is aligned with the high-resolution display 135 and the low-resolution display 140 shown in FIG. 1.

In a stereoscopic display mode, imagery may be displayed by the combination of the high-resolution display 125 and the low-resolution display 130 and viewed by the user's left eye via the eyepiece lens 206. Imagery may be concurrently displayed by the combination of the high-resolution display 135 and the low-resolution display 140 and viewed by the user's right eye via the eyepiece lens 208. Some embodiments of the high-resolution displays 125, 135 may be fabricated to include a bezel (not shown in FIG. 2) that encompasses an outer edge of the high-resolution displays 125, 135. The lenses 206, 208 or other optical devices may therefore be used to combine the images produced by the displays 125, 130, 135, 140 so that bezels around the high-resolution displays 125, 135 are not seen by the user. Instead, lenses 206, 208 merge the images to appear continuous across boundaries between the displays 125, 130, 135, 140.

In some embodiments, some or all of the electronic components that control and support the operation of the hybrid display 120 and other components of the electronic device 105 may be implemented within the housing 204. For example, the housing 204 may incorporate a global interface 210, high-resolution interfaces 212 and 214, and low-resolution interfaces 216 and 218. As discussed herein, the global interface 210 receives global commands 220 and translates or synchronizes the commands to form interface-specific commands that are provided to the interfaces 212, 214, 216, 218. Although the components 210, 212, 214, 216, 218 are depicted as monolithic blocks for ease of illustration, it will be appreciated that these electronic components may be implemented either as a single package or component, or as a set of discrete, interconnected electronic components. Moreover, in some embodiments, some or all of these electronic components may be implemented remote to the housing 204. To illustrate, the processing components of the display system may be implemented in a separate device, such as a tablet computer, notebook computer, desktop computer, compute-enabled cellphone, and which is connected to a HMD incorporating the hybrid display 120 via one or more wireless or wired connections.

Figure 3:
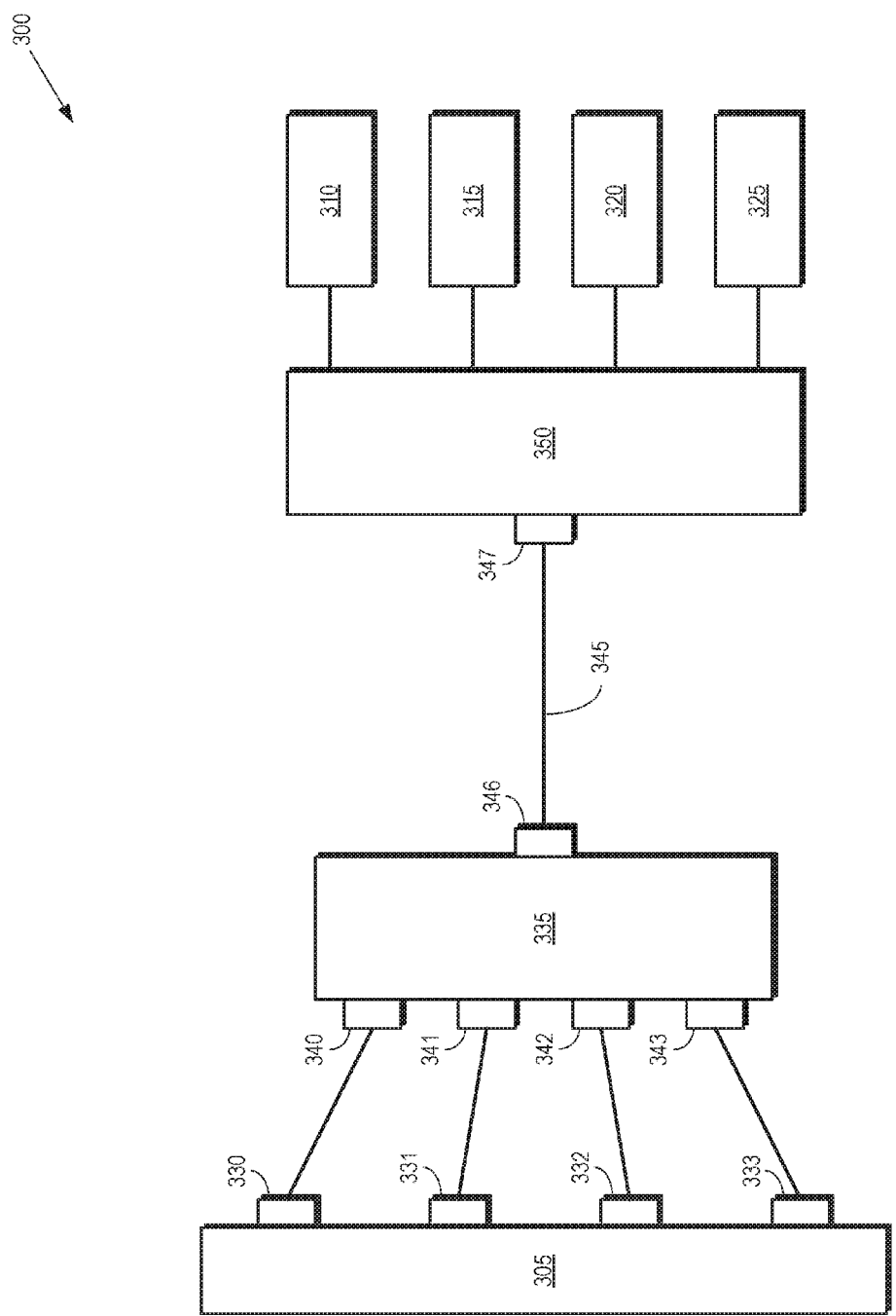
FIG. 3 is a block diagram of a processing system that is used to generate a display imagery using a hybrid display that includes high resolution and low-resolution displays in accordance with at least one embodiment of the present disclosure.

FIG. 3 is a block diagram of a processing system 300 that is used to generate display imagery using a hybrid display that includes high resolution and low-resolution displays in accordance with at least one embodiment of the present disclosure. The processing system 300 includes at least one processing unit 305 that generates signals representative of images for display, such as stereoscopic images for display to the left eye and the right eye of a user. The processing unit 305 may be implemented as a central processing unit (CPU), a graphics processing unit (GPU), one or more processor cores implemented in the CPU or GPU, or other processing device. In the illustrated embodiment, the processing unit 305 generates signals representative of images that are to be displayed using a hybrid display formed of four separate displays: a high-resolution display 310 and a low-resolution display 315 that are combined to provide images to a left eye of a user and a high-resolution display 320 and a low-resolution display 325 that are combined to provide images to a right eye of the user. Thus, the processing unit 305 includes four ports 330, 331, 332, 333 (referred to collectively as "the ports 330-333") for providing signals associated with the corresponding displays 310, 315, 320, 325. The ports 330-333 may be physical ports or logical ports.

The processing system 300 includes an interface 335 that receives signals from the processing unit 305 at corresponding ports 340, 341, 342, 343 (referred to collectively as "the ports 340-343"). The ports 340-343 may be physical ports or logical ports. The interface 335 combines the signals received at the ports 340-343 so that they may be transmitted over a single line such as a fiber-optic cable 345 that is coupled to a port 346. Some embodiments of the interface 335 include a processing unit and a transceiver that are configured to perform a multiplexing operation to combine the signals received at the ports 340-343 and transmit the multiplexed signal over the fiber-optic cable 345.

The fiber-optic cable 345 is also connected to a port 347 of an interface 350. Some embodiments of the interface 350 include a global interface such as the global interface 155 shown in FIG. 1, one or more high-resolution interfaces such as the high-resolution interface 145 shown in FIG. 1, and one or more low-resolution interfaces such as the low-resolution interface 150 shown in FIG. 1. The interface 350 may therefore receive signals including global commands generated by the processing unit 305. As discussed herein, the global commands may be translated into interface-specific commands, which may be synchronized to reduce visual artifacts in the images displayed by the displays 310, 315, 320, 325.

Figure 4:
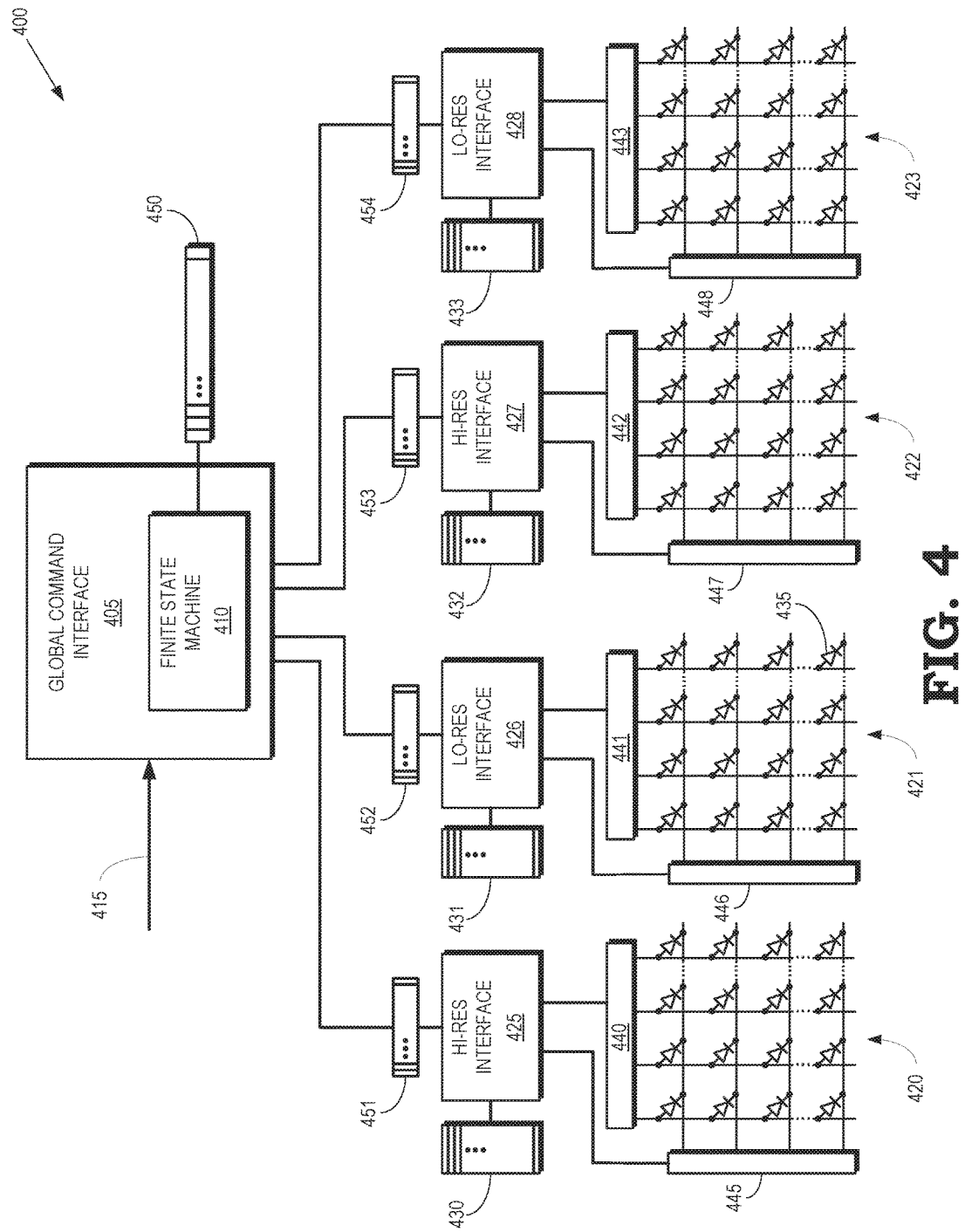
FIG. 4 is a block diagram of a display system including a global interface that implements a finite state machine in accordance with at least one embodiment of the present disclosure.

FIG. 4 is a block diagram of a display system 400 including a global command interface 405 that implements a finite state machine 410 in accordance with at least one embodiment of the present disclosure. Although the finite state machine 410 is depicted as an integral component of the global command interface 405, some embodiments may implement the finite state machine 410 external to the global command interface 405. The global command interface 405 is configured to receive signals 415 including global commands that are used to control the output of the displays 420, 421, 422, 423 (referred to collectively as "the displays 420-423"), which include high-resolution displays 420, 422 and low-resolution displays 421, 423. In the interest of clarity, the displays 420-423 are depicted side-by-side in FIG. 4. However, the displays 420-423 are intended to implement a hybrid display such as the hybrid display 120 shown in FIG. 1. For example, the high-resolution display 420 may be combined or overlaid with the low-resolution display 421 to provide images to the left eye of a user. The high-resolution display 422 may be combined or overlaid with the low-resolution display 423 to provide images to the right eye of a user.

Each of the displays 420-423 receives data and control signals via a corresponding one of interfaces 425, 426, 427, 428 (collectively referred to as "the interfaces 425-428"). In the illustrated embodiment, the high-resolution displays 420, 422 are controlled by signals received from the high-resolution interfaces 425, 427 and the low-resolution displays 421, 423 are controlled by signals received from the low-resolution interfaces 426, 428. The interfaces 425-428 are connected to corresponding sets of registers 430, 431, 432, 433 (collectively referred to as "the register sets 430-433") that store values that are used to determine the signals provided to the displays 420-423. For example, the register sets 430-433 may be used to store luma values that are used to determine a bias current or voltage that is applied to pixels in the displays 420-423 in response to input signals representative of the luma, e.g., input signals received from the global command interface 405. The register sets 430-433 may also be used to store values of chroma that control the bias currents or voltages applied to pixels in the displays 420-423 in response to input signals representative of chroma, values of color matrices that are used to transform luma and chroma to RGB values used by the displays 420-423, values of gamma that determine a power law relationship between an input value of luma and a gamma-corrected value of luma used for encoding, values of color coordinates, or values of a color gamut. Some embodiments of the register sets 430-433 store values of timing parameters that are used to determine timing of the signals provided to the interfaces 425-428 or transmitted by the interfaces 425-428. For example, the register sets 430-433 may store values that specify timing of a horizontal synchronization signal that separates scan lines in the displays 420-423, a vertical synchronization signal that separates fields in the displays 420-423, pixel scan directions, a blanking interval during which no data is transmitted from the interfaces 425-428 to the corresponding displays 420-423, and the like.

The displays 420-423 are composed of pixels 435 formed of display elements such as light emitting diodes (LEDs) or organic light emitting diodes (OLEDs). In the interest of clarity only one of the pixels 435 is indicated by a reference numeral. The pixels 435 in the displays 420-423 are selectively activated though respective column drivers 440, 441, 442, 443 (collectively referred to as "the column drivers 440-443") and row drivers 445, 446, 447, 448 (collectively referred to as "the row drivers 445-448"). The interfaces 425-428 provide control signals to the corresponding column drivers 440-443 and row drivers 445-448. For example, the interface 425 may provide a row select indicator to the row driver 445 indicating a row of the display 421 based on a row position of a received pixel row and provide pixel row data to the column driver 440 representing the pixel values of the pixels in the received pixel row. The row driver 445 and the column driver 440 then control their respective outputs to the display 421 based on these inputs so as to selectively activate pixels in the corresponding row of the display 421 so as to display a representation of the pixel row at that row of display 421.

Global commands include values (or modifications to values) of image parameters that are intended to produce a predetermined modifications in observed images produced by the pixels in the displays 420-423. Conventional global commands assume that providing the same value (or the same modification to the value) of the image parameters will produce the same modification in the observed images produced by the pixels in all of the displays 420-423. This assumption does not necessarily hold true in a hybrid display that includes both high-resolution displays 420, 422 and low-resolution displays 421, 423 because of the different physical characteristics of these displays. For example, configuring the interfaces 425-428 with a single value of luma included in a global command may result in different bias currents or voltages being applied to the pixels in the high-resolution displays 420, 422 and low-resolution displays 421, 423, which may result in a different observed brightness or change in the observed brightness in the different displays 420-423.

The finite state machine 410 may therefore translate the parameters in global commands based on the different physical characteristics of the displays 420-423. For example, gamma correction (or gamma encoding and decoding) may be used to compress the number of bits needed to encode an image by taking advantage of the non-linear response of the human eye to light in color. A power law relation between an input value (such as luminance) and an output value is set by the value of γ:

$$V_{out} = A V_{in}^{\gamma}$$

The input value a parameter is provided by the global command and the output value is used to encode the parameter. However, the high-resolution displays 420, 422 may have a value of $\gamma_{hi}$ that differs from the value of $\gamma_{lo}$ associate with the low-resolution displays 421, 423. The finite state machine 410 may therefore translate the global command to interface-specific commands to account for the differences between the gamma values used by the different displays 420-423. For example, the finite state machine 410 may modify values of $\gamma_{hi}$ or $\gamma_{lo}$ so that the interface-specific commands generated based on a global command produce a predetermined modification in the observed images produced by the pixels in all of the displays 420-423. The finite state machine 410 may also translate the global command to correspond to the format used by the corresponding interfaces 425-428. For example, the finite state machine 410 may transmit the format of the global command to formats used by the inter-integrated circuit (I²C), a Mobile Industry Processor Interface (MIPI), an embedded display port (eDP) interface, or a mobile display digital interface (MDDI), depending on the type of interface.

The global command interface 405 provides the interface-specific commands to the interfaces 425-428 during blanking intervals that occur between the refresh periods during which the corresponding interfaces 425-428 refresh the signal applied to the pixels 435 to reflect any changes in the image. The blanking intervals are defined by a vertical synchronization signal (VSYNC). For example, a blanking interval may begin with the rising edge of the VSYNC signal and may end with the falling edge of the VSYNC signal. Alternatively, the blanking interval may begin with the falling edge of the VSYNC signal and end with the rising edge of the VSYNC signal, depending on the state of a polarity signal. However, differences in the control path speeds of the interfaces 425-428 and different amounts of overhead in the data packets that include the interface-specific commands transmitted to the interfaces 425-428 can introduce timing delays between the VSYNC signals so that the blanking intervals for the different interfaces 425-428 are out of synchronization.

A register 450 includes information indicating the relative timing delays between the high-resolution interfaces 425, 427 and the low-resolution interfaces 426, 428. The finite state machine 410 may access the information in the register 450 and use this information to account for the timing delays when scheduling transmission of the interface-specific commands to the interfaces 425-428. For example, the finite state machine 410 may provide the interface-specific commands to first-in-first-out (FIFO) buffers 451, 452, 453, 454 (collectively referred to herein as "the FIFO buffers 451-454") at times that are determined based on the relative timing delay so that this information is available to configure the interfaces 425-428 during the corresponding blanking intervals. Configuring the interfaces 425-428 may include updating or modifying timing information in the register sets 430-433 using information included in the interface-specific commands. The finite state machine 410 may also use the relative timing delays indicated by the value of the register 450 to synchronize the blanking intervals by selectively delaying one or more VSYNC signals utilized by one or more of the interfaces 425-428.

Figure 5:
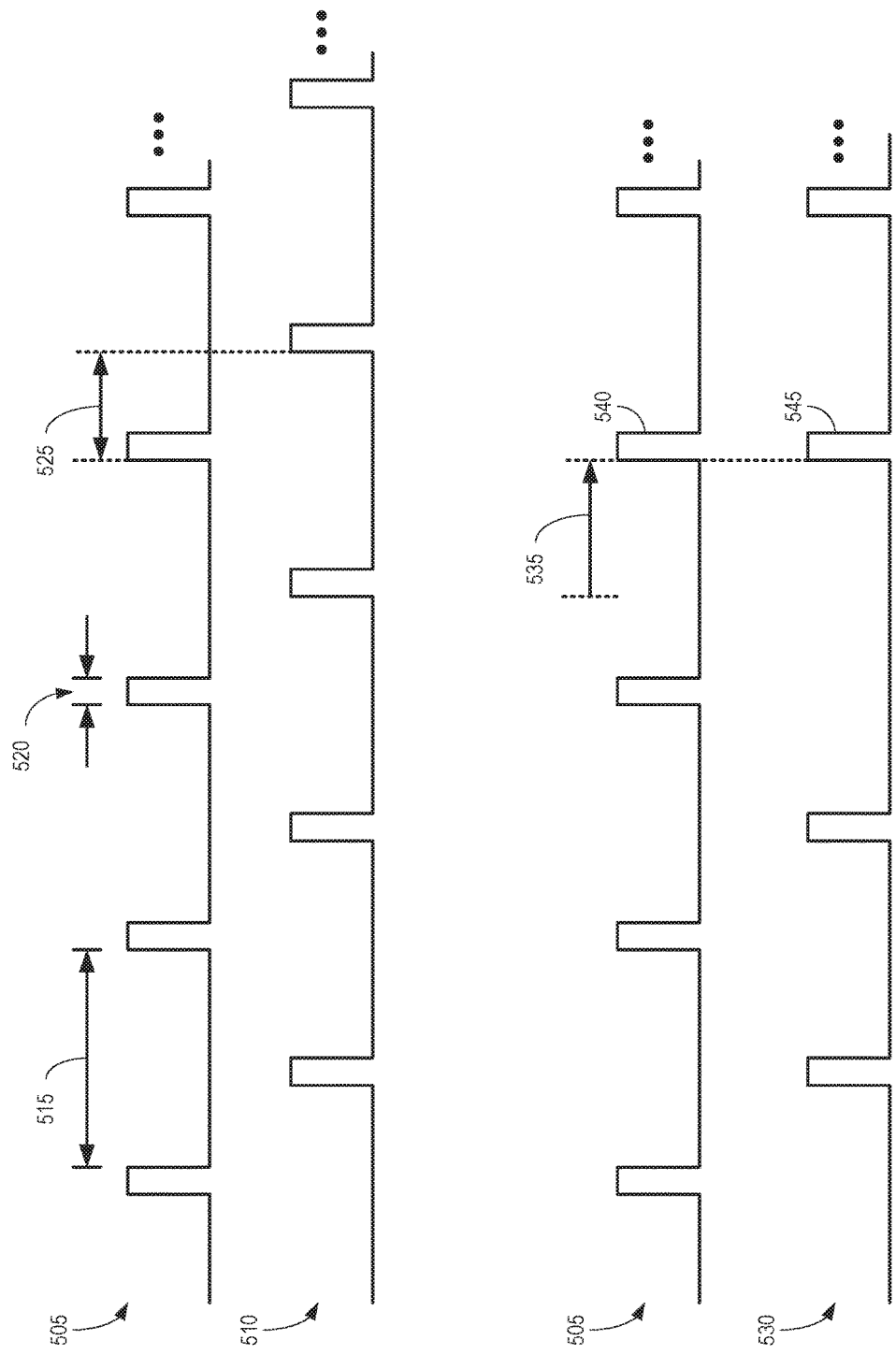
FIG. 5 illustrates VSYNC signals utilized by a high-resolution display and a low-resolution display that form a hybrid display in accordance with at least one embodiment of the present disclosure.

FIG. 5 illustrates VSYNC signals utilized by a high-resolution display and a low-resolution display that form a hybrid display in accordance with at least one embodiment of the present disclosure. The VSYNC signal 505 is provided to the high-resolution display and the VSYNC signal 510 is provided to the low-resolution display. In the illustrated embodiment, a falling edge of the VSYNC signals 505, 510 indicates the beginning of a refresh interval such as the refresh interval 515. The pixels in the displays are refreshed during the refresh interval 515 based on signals provided by the corresponding interfaces and values of configuration registers such as the register sets 430-433 shown in FIG. 4. A rising edge of the VSYNC signals 505, 510 indicates the beginning of a blanking interval such as the blanking interval 520. No data is transmitted from the interfaces to the corresponding displays during the blanking interval 520. The blanking interval 520 may therefore be used to update the configuration of the interfaces to the displays. For example, configuration information provided to the interfaces 425-428 by the global command interface 405 shown in FIG. 4 may be used to reconfigure the interfaces 425-428 during the blanking interval 520, e.g., by storing updated or modified information in the register sets 430-433.

The VSYNC signals 505, 510 are out of synchronization. In the illustrated embodiment, the VSYNC signal 505 is delayed relative to the VSYNC signal 510 by a relative delay 525. A finite state machine (such as the finite state machine 410 shown in FIG. 4) may therefore synchronize operation of the high-resolution and low-resolution displays by modifying one or more of the VSYNC signals 505, 510. In the illustrated embodiment, the finite state machine determines a value of the relative delay 525 (e.g. by accessing the register 450 shown in FIG. 4) and then delays the VSYNC signal 510 by a delay interval 535 to form the delayed VSYNC signal 515. The interface-specific commands that are generated based on a global command may be used to configure the corresponding interfaces of the high-resolution display and the low-resolution display during the synchronized blanking intervals 540, 545. Synchronizing the interface-specific commands may reduce flicker caused by applying a global command to both the high-resolution display and the low-resolution display in a hybrid display.

Figure 6:
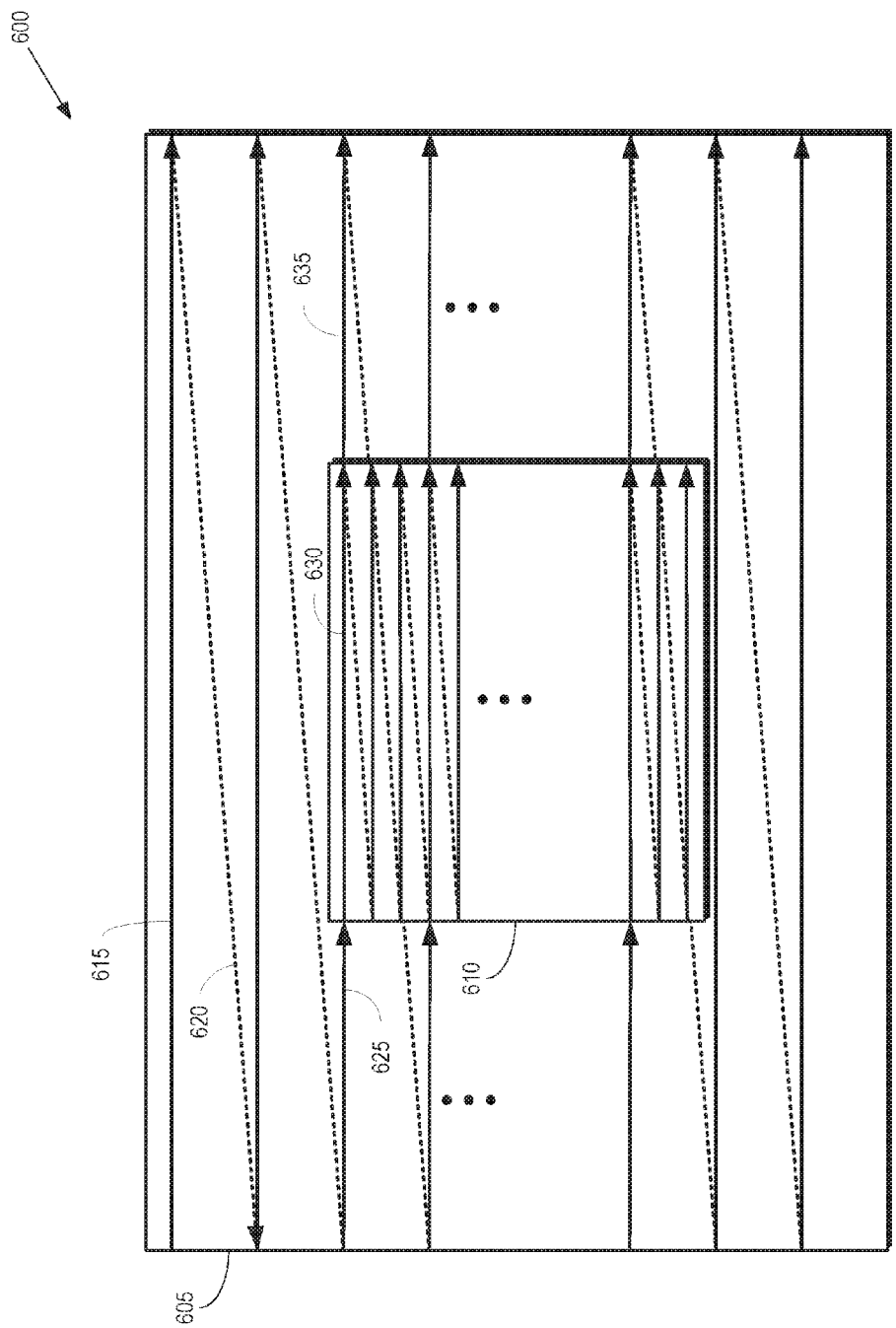
FIG. 6 is a block diagram of a hybrid display including a low-resolution display and a high-resolution display in accordance with at least one embodiment of the present disclosure.

FIG. 6 is a block diagram of a hybrid display 600 including a low-resolution display 605 and a high-resolution display 610 in accordance with at least one embodiment of the present disclosure. The low-resolution display 605 may be used to implement some embodiments of the low-resolution displays 130, 140 shown in FIG. 1 and the high-resolution display 610 may be used to implement some embodiments of the high-resolution displays 125, 135 shown in FIG. 1. Pixels in the low-resolution display 605 and the high-resolution display 610 are refreshed in a sequence indicated by scan lines such as the scan line 615 at the top of the low-resolution display 605. The arrow in the scan line 615 indicates that the pixels are refreshed from left to right. Separate scan lines in the illustrated embodiment are refreshed from top to bottom, as indicated by the dotted arrow 620. However, some embodiments of the hybrid display 600 may use other scan patterns including refreshing the scan lines from right to left or bottom to top.

The scan lines in the low-resolution display 605 are interrupted by scan lines in the high-resolution display 610. For example, the scan line 625 in the low-resolution display 605 is interrupted by the scan line 630 in the high-resolution display 610, before resuming as the scan line 635 and the low-resolution display 605. Furthermore, the low-resolution display 605 has a lower pixel density than the high-resolution display 610 and, consequently, the density of scan lines is lower in the low-resolution display 605 than the high-resolution display 610. For example, there are three scan lines in the high-resolution display 610 for each scan line in the low-resolution display 605.

Absence of coordination between the timing used to refresh the scan lines in the low-resolution display 605 and the high-resolution display 610 may generate flicker in the resulting image, particularly when executing global commands. A finite state machine associated with a global command interface (such as finite state machine 410 associated with the global command interface 405 shown in FIG. 4) may therefore generate, in response to receiving a global command, interface-specific commands to configure the high and low-resolution interfaces to coordinate the timing used to refresh the scan lines in the two displays 605, 610. Some embodiments of the interface-specific commands include information to configure or modify values indicating timing parameters such as a timing of a horizontal synchronization signal that separates scan lines in the displays, pixel scan directions, and the like. For example, the interface-specific commands may include values that configure the high-resolution display 610 to begin refreshing the scan line 630 at substantially the same time that the low-resolution display 605 finishes refreshing the scan line 625. The low-resolution display 605 may also be configured to begin refreshing the scan line 635 at substantially the same time that the high-resolution display 610 finishes refreshing the scan line 630. Timing parameters may also be configured or modified so that scan lines in the high-resolution display 610 are refreshed at a higher frequency than the scan lines in the low-resolution display 605 to account for the different pixel densities or scan line densities. The values may be stored in registers such as the register sets 430-433 shown in FIG. 4 during a blanking interval, as discussed herein.

Figure 7:
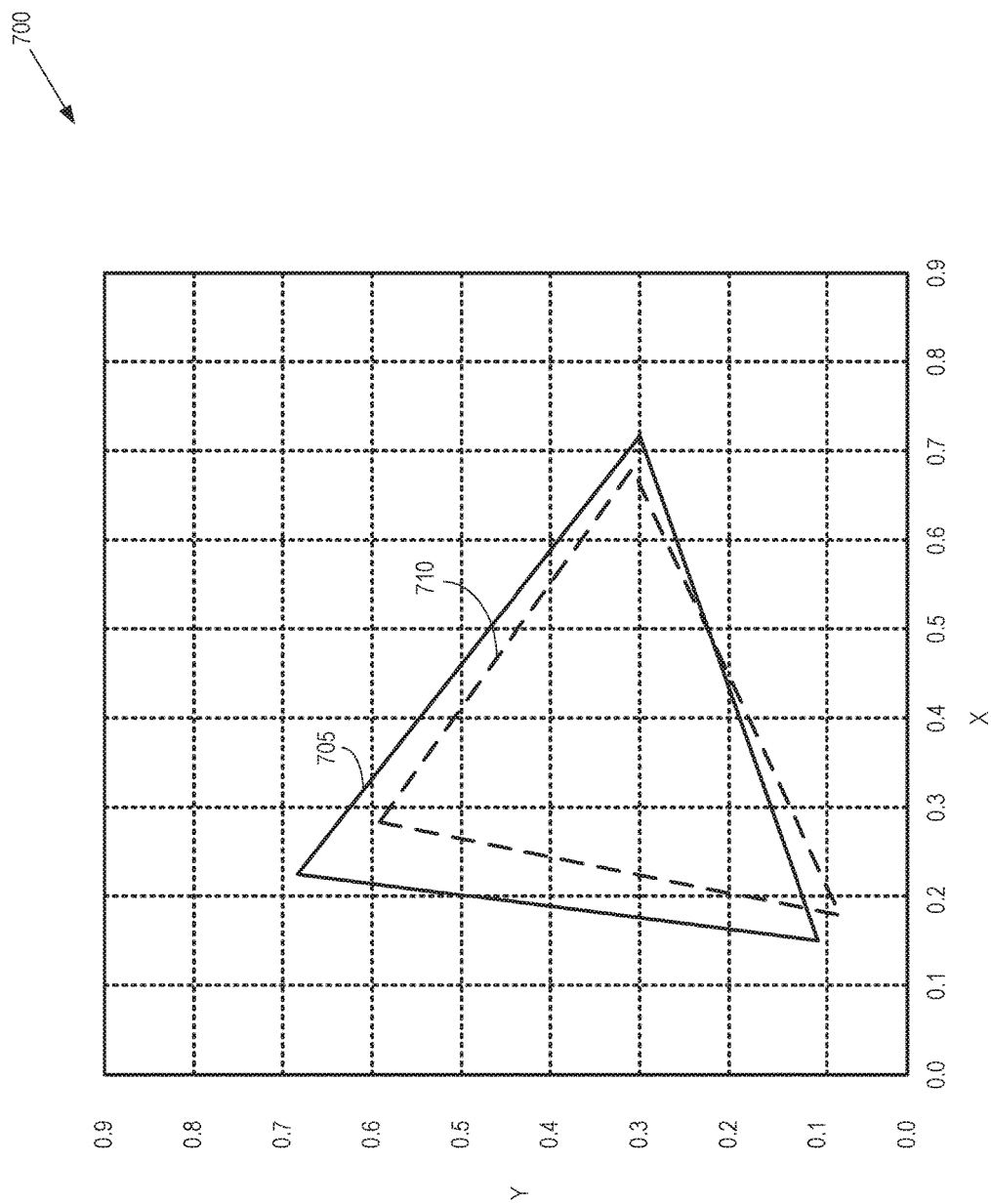
FIG. 7 is an XY chromaticity diagram that indicates a color gamut of a high-resolution display and a color gamut of a low-resolution display in accordance with at least one embodiment of the present disclosure.

FIG. 7 is an XY chromaticity diagram 700 that indicates a color gamut 705 of a high-resolution display and a color gamut 710 of a low-resolution display in accordance with at least one embodiment of the present disclosure. The vertical axis indicates the y-coordinate in the XYZ color system established by the International Commission on Illumination (CIE) and the horizontal axis indicates the x-coordinate in the XYZ color system. The values of these coordinates determine the RGB values of the colors that can be displayed by the corresponding displays. For example, the color gamut 705 may correspond to 80% of the standard RGB (sRGB) color range and 75% of the National Television System Committee (NTSC) standard color range. Although the XY chromaticity diagram 700 shown in FIG. 7 is depicted in black and white, persons of ordinary skill in the art should appreciate that each point in the XY chromaticity diagram 700 corresponds to a different color with greener colors being found in the upper left, bluer colors in the lower left, and redder colors to the right of the XY chromaticity diagram 700.

The different shapes of the color gamut 705 and the color gamut 710 indicate that the high-resolution display and the low-resolution display are capable of displaying different ranges (or gamuts) of colors. Consequently, a global command that indicates one or more colors (or one or more modifications to colors) that are to be displayed by the high-resolution display and the low-resolution display may result in different colors in the observed images produced by the high-resolution display and the low-resolution display. A finite state machine associated with a global command interface (such as finite state machine 410 associated with the global command interface 405 shown in FIG. 4) may therefore translate the values in the global command to interface-specific commands based on the color gamut 705 and the color gamut 710. For example, the finite state machine may apply a filter to the values in the global command to generate interface-specific commands that control the high-resolution display to account for the larger color gamut 705 reproducible by the high-resolution display. Applying the filter may reduce differences in the colors in the observed image produced by the high-resolution display and the low-resolution display in response to the global command.

Figure 8:
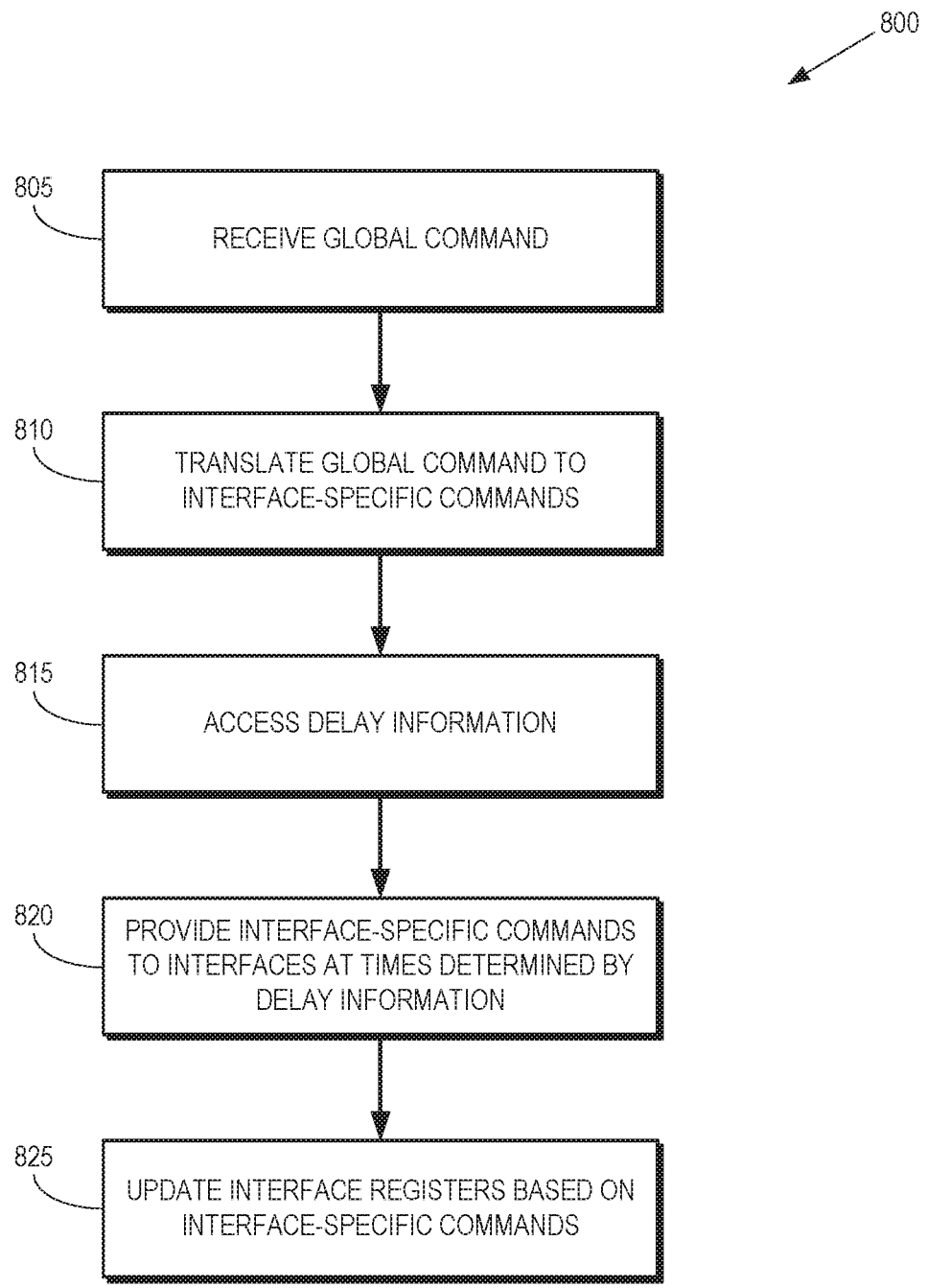
FIG. 8 is a flow diagram of a method of providing global commands to interfaces of a high-resolution display and a low-resolution display in a hybrid display in accordance with at least one embodiment of the present disclosure.

FIG. 8 is a flow diagram of a method 800 of providing global commands to interfaces of a high-resolution display and a low-resolution display in a hybrid display in accordance with at least one embodiment of the present disclosure. The method 800 may be implemented in some embodiments of the display system 100 shown in FIG. 1, the display system as shown via cross-section view 200 in FIG. 2, the processing system 300 shown in FIG. 3, or the display system 400 shown in FIG. 4.

At block 805, a global command interface receives a global command that indicates values (or modifications to values) of pixels in one or more high-resolution displays and one or more low-resolution displays of a hybrid display. At block 810, a finite state machine associated with the global command interface translates the global command to interface-specific commands. Translation of the global command to the interface-specific commands may include modifying values of parameters that control the displays based on the characteristics of the interfaces to the high-resolution displays and the low-resolution displays, modifying the format of the global command to correspond to the formats used by the interfaces to the high-resolution displays and the low-resolution displays, and the like.

At block 815, the finite state machine accesses delay information that indicates relative timing delays between the high-resolution displays and the low-resolution displays. For example, the delay information may indicate a relative delay between VSYNC signals that define refresh intervals and blanking intervals for the displays. Some embodiments of the finite state machine access the delay information from an associated register. At block 820, the global command interface provides the interface-specific commands to the interfaces for the high-resolution displays and the low-resolution displays at times determined by the delay information. For example, the global command interface may delay (or may instruct the high-resolution display interface or the low-resolution display interface to delay) one or more of the VSYNC signals to synchronize the blanking intervals for the different interfaces. The global command interface may then provide the interface-specific commands to FIFO buffers associated with the different interfaces so that they are available to configure the interfaces during the blanking interval.

At block 825, register sets associated with the different interfaces are updated based on the interface-specific commands. For example, values of the registers (or modifications to the values of the registers) may be written from the FIFO buffers to the corresponding register sets to reconfigure the different interfaces. Once the blanking interval ends, the updated or modified values in the register sets are used to control the image that is produced during the subsequent refresh interval.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
receiving a first command comprising a first value indicating a modification of pixels in a hybrid display that comprises a first display and a second display, wherein receiving the first command comprises receiving the first value indicating a modification of a characteristic of an image produced by pixels in the first display and the second display;
translating the first value to a second value indicating a modification of pixels in the first display and a third value indicating a modification of pixels in the second display, wherein translating the first value to the second value and the third value comprises translating the first value to a second value indicating a modification of the characteristic of the image produced by the pixels in the first display and a third value indicating a modification of the characteristic of the image produced by the pixels in the second display, wherein the modification of the characteristic of the image produced by the pixels in the first display indicated by the second value is substantially the same as the modification of the characteristic of the image produced by the pixels in the second display indicated by the third value; and
transmitting a second command comprising the second value and a third command comprising the third value at times determined by a relative delay between the first display and the second display.

2. The method of claim 1, wherein receiving the first command comprises receiving a first command indicating at least one value of at least one of luma, chroma, gamma, a color matrix, and color coordinates of pixels in the hybrid display.

3. The method of claim 2, wherein translating the first value to the second and third values comprises translating the at least one value to second and third values of the at least one of the luma, the chroma, the gamma, the color matrix, and the color coordinates of pixels in the first and second displays so that the modification indicated in the first command generates predetermined modifications in observed images produced by the first and second displays.

4. The method of claim 1, wherein receiving the first command comprises receiving a first command indicating at least one value of at least one of timing of a horizontal synchronization signal, timing of a vertical synchronization signal, a pixel scan direction, and a blanking interval.

5. The method of claim 4, wherein translating the first value to the second and third values comprises translating the at least one value to second and third values of the at least one of the timing of the horizontal synchronization signal, the timing of the vertical synchronization signal, the pixel scan direction, and the blanking interval based on relative positions and pixel densities of the first and second displays.

6. The method of claim 1, wherein transmitting the second command and the third command comprises synchronizing transmission of the second and third commands based on the relative delay such that modifications to an observed image produced by the first and second displays occur at substantially the same time in response to the second and third commands, respectively.

7. The method of claim 6, wherein synchronizing transmission of the second and third commands further comprises delaying, by the relative delay, at least one vertical synchronization signal that defines a blanking interval for at least one of the first and second displays.

8. The method of claim 1, further comprising:
displaying imagery at the first display and the second display based on the second and third commands.

9. An apparatus comprising:
a hybrid display comprising a first display having a first interface and a second display having a second interface;
a third interface to receive a first command comprising a first value indicating a modification of a characteristic of an image produced by pixels in the first display and the second display; and
a finite state machine to translate the first value to a second value indicating a modification of the characteristic of the image produced by the pixels in the first display and a third value indicating a modification of the characteristic of the image produced by the pixels in the second display, wherein the first interface transmits a second command comprising the second value to the first interface and a third command comprising the third value to the second interface at times determined by a relative delay between the first display and the second display, wherein the modification of the characteristic of the image produced by the pixels in the first display indicated by the second value is substantially the same as the modification of the characteristic of the image produced by the pixels in the second display indicated by the third value.

10. The apparatus of claim 9, wherein the third interface is to receive a first command indicating at least one value of at least one of luma, chroma, gamma, a color matrix, and color coordinates of pixels in the hybrid display.

11. The apparatus of claim 10, wherein the finite state machine is to translate the at least one value to second and third values of the at least one of the luma, the chroma, the gamma, the color matrix, and the color coordinates of pixels in the first and second displays so that the modification indicated in the first command generates predetermined modifications in observed images produced by the first and second displays.

12. The apparatus of claim 9, wherein the third interface is to receive a first command indicating at least one value of at least one of timing of a horizontal synchronization signal, timing of a vertical synchronization signal, a pixel scan direction, and a blanking interval.

13. The apparatus of claim 12, wherein the finite state machine is to translate the at least one value to second and third values of the at least one of the timing of the horizontal synchronization signal, the timing of the vertical synchronization signal, the pixel scan direction, and the blanking interval based on relative positions and pixel densities of the first and second displays.

14. The apparatus of claim 9, further comprising:
a first register to store a value indicating the relative delay, and wherein the finite state machine is to access the value in the first register.

15. The apparatus of claim 14, wherein the third interface is to synchronize transmission of the second and third commands based on the relative delay such that modifications to an observed image produced by the first and second displays occur at substantially the same time in response to the second and third commands, respectively.

16. The apparatus of claim 15, wherein the third interface is to synchronize transmission of the second and third commands by delaying, by the relative delay, at least one vertical synchronization signal that defines a blanking interval for at least one of the first and second displays.

17. A head mounted display system comprising:
a hybrid display comprising two first displays having corresponding first interfaces and two second displays having corresponding second interfaces, wherein a first combination of a first display and a second display is to provide images to a left eye and a second combination of a first display and a second display is to provide images to a right eye;
a third interface to receive a first command comprising a first value indicating a modification of characteristics of images produced by pixels in the first display and the second display; and
a finite state machine to translate the first value to second values indicating modification of the characteristics of the images produced by the pixels in the first displays and third values indicating modification of the characteristics of the images produced by the pixels in the second displays, wherein the first interface transmits second commands comprising the second values to the first interfaces and third commands comprising the third values to the second interfaces at times determined by a relative delay between the first displays and the second displays, and wherein the modification of the characteristics of the images produced by the pixels in the first displays indicated by the second value are substantially the same as the modification of the characteristics of the images produced by the pixels in the second displays indicated by the third value.

18. The head mounted display system of claim 17, wherein the finite state machine is to translate the first value to second and third values of at least one of luma, chroma, gamma, a color matrix, and color coordinates of pixels in the first and second displays so that the modification indicated in the first command generates predetermined modifications in observed images produced by the first and second displays.

19. The head mounted display system of claim 17, wherein the finite state machine is to translate the first value to second and third values of at least one of timing of a horizontal synchronization signal, timing of a vertical synchronization signal, a pixel scan direction, and a blanking interval based on relative positions and pixel densities of the first and second displays.

20. The head mounted display system of claim 17, wherein the third interface is to synchronize transmission of the second and third commands based on the relative delay such that modifications to an observed image produced by the first and second displays occur at substantially the same time in response to the second and third commands, respectively.

* * * * *